Jan. 29, 1963 R. A. DEIBEL ETAL 3,075,226
WINDSHIELD WIPER SYSTEM
Filed Jan. 30, 1959

INVENTORS
RAYMOND A. DEIBEL
BY and WILLIAM C. RIESTER
Bean Brooks Buckley & Bean
ATTORNEYS

United States Patent Office 3,075,226
Patented Jan. 29, 1963

3,075,226
WINDSHIELD WIPER SYSTEM
Raymond A. Deibel, Cheektowaga, and William C. Riester, Williamsville, N.Y., assignors to Trico Products Corporation, Buffalo, N.Y.
Filed Jan. 30, 1959, Ser. No. 790,248
19 Claims. (Cl. 15—250.12)

This invention relates to an improvement in a hydraulically actuated windshield wiper system for an automotive vehicle. The instant windshield wiper system is designed to selectively establish continuously maintained pressure from the hydraulic pump used primarily for intermittent purpose use for steering the vehicle and in a manner that in no way impairs the displacement capacity of the pump for the steering power system. The wiper system thus becomes a secondary hydraulic system and utilizes hydraulic pressure derived from a primary hydraulic system, herein the power steering apparatus, which latter includes a pump driven from the power plant of the vehicle which is operating all of the time that the engine is operating, but normally idling most of the time without doing any work.

The invention is directed to the establishment of fluid pressure potential of the full-time hydraulic pressure pump while the pump pressure is intermittently used, and also when the pump gearing is coasting, or in simulated idling use, to meet the developed demand for a dependable power source to provide greatly increased torque requirements for clearing modern windshields. Wiper blades with more glass surface contact have been adopted to clear larger expanse of the newer curved or panoramic windshields. This need has led to highly increased outlays for battery powered electric motors, with the attendant hazards of failure and costly repair.

The instant invention establishes the wiper drive from the car engine's excess horsepower through the efficient hydraulic fluid transmission means in a manner that enables the car buyer to enjoy the full benefits, including the safety of power steering together with car-lifelong serviceable fluid pressure motors capable of meeting any conceivable wiping torque requirement for the increased wiping pattern and for higher frequency wiping to match the higher car speed travel on the modern turnpikes and thruways.

According to the present disclosure, the power steering apparatus embodies a control valve through which fluid from the pump normally circulates freely. In its normal position the control valve is on its dead-center and the piston of a double acting booster motor is pressure balanced. A pull on the steering wheel moves the valve off its dead-center position for unequally dividing the fluid flow to unbalance the booster piston for imparting a boosting effort upon the steering mechanism and until a pressure balance is again obtained. If the booster piston moves easily there is very little pressure developed because the piston displacement uses the oil delivery from the pump. If the piston movement is resisted, the pressure goes up immediately to overcome the resistance, to as high as 1000 or 1100 pounds per square inch if necessary.

In the instant combination of the hydraulic power steering apparatus and the hydraulic wiper motor, the hydraulic fluid is routed first through the steering mechanism for its primary performance and then through a divided return flow of the released or spent liquid, either for operation of the windshield wiper motor or through its bypassing pressure regulating valve. The booster motor and the windshield wiper motor are therefore connected in series in the fluid circuit. The combined pressure regulator and bypass valve constitutes a hydrostatic coupler which is utilized to resist the flow to the sump, thereby employing the spent fluid from the steering system to build up the nominal required pressure for the operation of the windshield wiper motor.

When the wiper motor is not in operation, a column of fluid is piped to the motor throttle for subsequently initiating the action of the coupler for wiper motor operation. Otherwise the entire steering system return flow passes freely through the wiper motor coupler bypass valve which, under this condition, is functioning at substantially no pressure other than that of fluid flow resistance. The pressure regulating valve is in a substantially open position, allowing for relatively free flow of spent fluid without developing even enough pressure to run the wiper. Consequently, the primary hydraulic system is unloaded of the windshield wiper system when the latter is not operating, and when the windshield wiper is operating, it will be seen from the foregoing that all wiper operations is accomplished by the use of spent fluid which has been discharged from the power steering apparatus on its way back to the sump or reservoir.

The primary object of the windshield wiper invention is to achieve the economy in using two separate hydraulic systems powered by a single pump unit, in combination with a hydrostatic coupler, in which a first or primary intermittently operated high pressure system is in series with a secondary low pressure selectively continuously usable system for automatic performance whereby the primary system is unaffected when the secondary system is either in operation or dormant, and when both systems are conjointly in use, the secondary system always operates only on fluid from the primary system, the use of the secondary system being effected by flow through the primary system whether the latter is operating or dormant.

Another object resides in the use of an automatic coupler in a windshield wiper system arranged in series with a primary hydraulic system and responsive to manual initiation to regulate the spent fluid flow by modified resistance thereto for building up the pressure of the spent fluid for operation of a secondary hydraulic system.

A further object of the invention is to utilize the spent fluid from the power steering system in an automatically redirected flow of the fluid to operate the wiper motor accessory at all times when the engine is running and when it is manually initiated and automatically regulated in response to the initiating means.

Another object of the invention is to provide a hydraulically actuated windshield wiper system which utilizes by-product power produced incidental to the operation of a primary powered unit of the vehicle to produce dependable wiper operation without interfering with or altering the normal operation of the primary unit.

Another object of the invention is to utilize persistence of flow in the spent fluid in conjunction with an automatic resistance to flow thereof so as to build up and maintain suitable hydraulic pressure for operation of the wiper.

Still another object of the invention is to utilize the spent fluid flow initiated by a hydraulic system pump after it has served its primary purpose, as a secondary means for the operation of a windshield wiper mechanism and the final parking of the wipers under the hydraulic pressure.

A still further object of the invention is to utilize a fluid coupling for the operation of the control of a wiper motor to couple the wiper motor with its source of power for operation and to control the wiper motor's operation for conjoint operation with the primary purpose and usage of the pump.

In the accompanying drawing:
FIG. 1 is a fragmentary perspective view of an automotive vehicle having a hydraulic power steering system and mounting the improved hydraulically actuated windshield wiper system of the present invention, certain parts of the vehicle being omitted in the interest of clarity;

Figures 1, 2, 3, 4, 5:
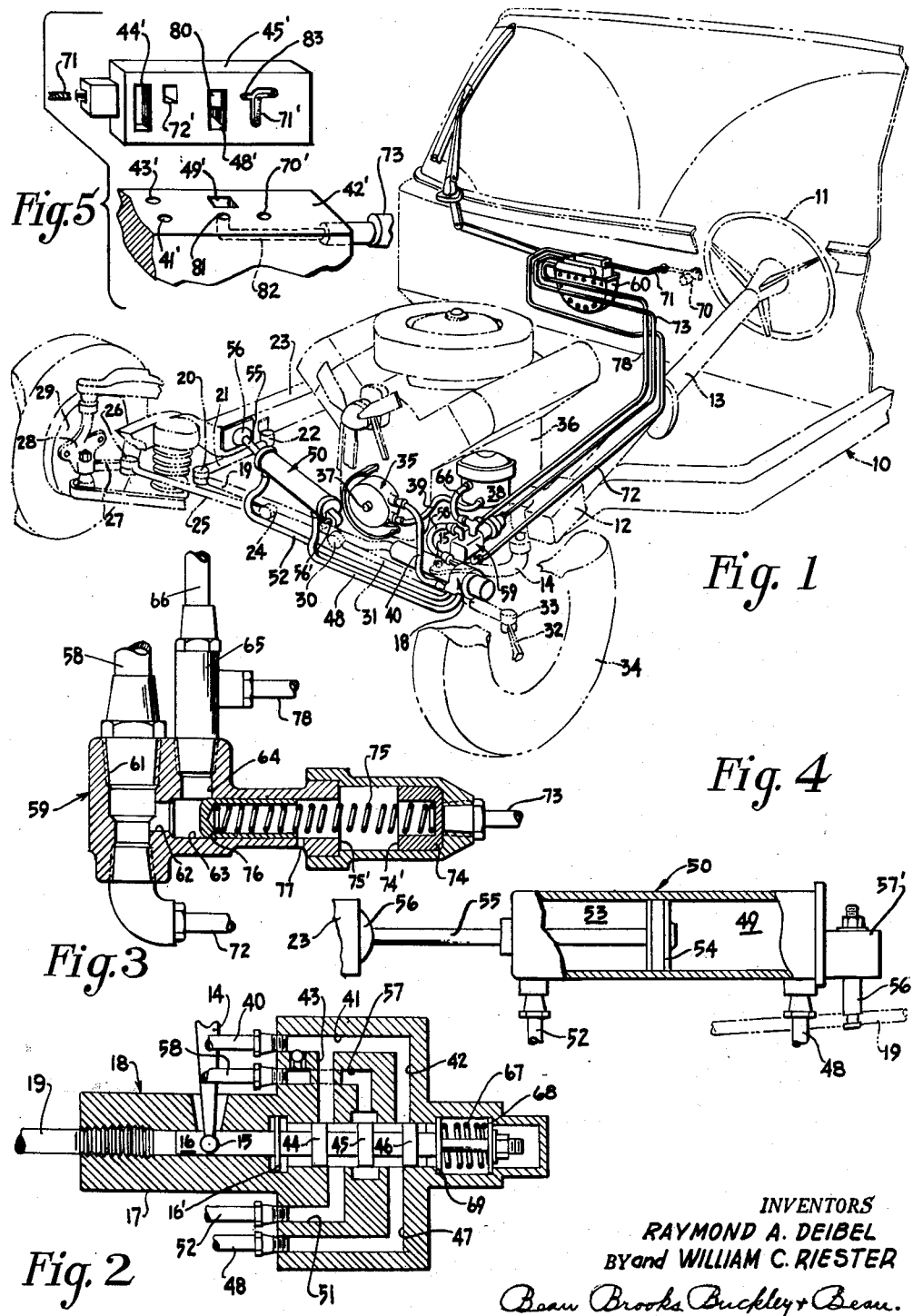
FIG. 2 is an enlarged view, partially in cross-section, of a control valve utilized in the power steering system.
FIG. 3 is a view, partially in cross-section, of a control valve which is utilized for automatically conducting fluid at the necessary pressure to an operating hydraulic windshield wiper motor.
FIG. 4 is a view, partially in cross-section, of a fluid pressure motor of the power steering apparatus which is utilized to aid in turning the vehicle wheels.
FIG. 5 is a fragmentary perspective view of a portion of the wiper motor slide valve and the valve seat with which it coacts.

In FIG. 1, an automotive vehicle 10 is shown having a conventional steering wheel 11 which is coupled to conventional gear box 12 through steering column 13. Operatively coupled to gear box 12 is one end of arm 14. The turning of the steering wheel 11 results in a corresponding movement of arm 14. The other end of arm 14 is pivotally mounted, as by a ball joint 15 (FIG. 2), to valve stem 16 which is located within housing 17 of control valve 18 (FIGS. 1 and 2). Therefore, when the steering wheel 11 is actuated, there will be a small movement of valve stem 16 within housing 17, as described in detail hereafter.

Secured to one end of control valve housing 17, as by a threaded connection, is one end of a steering arm 19 (FIGS. 1 and 2). The other end of arm 19 is pivotally connected by ball joint 20, to one end of idler arm 21, the other end of which is pivotally connected as at 22 to the vehicle frame 23. Arms 14 and 21 are essentially corresponding ends of a parallelogram type of linkage which guide the path of steering arm 19. Connected intermediate the ends of arm 19 by a suitable swivel connection 24 is one end of a first spindle connecting rod 25, the other end of which is connected through a suitable ball joint 26 to the arm 27 extending from spindle 28 which is rigidly secured to wheel drum 29. Also suitably connected intermediate the ends of steering arm 19 by a suitable swivel connection 30 is one end of a second spindle connecting rod 31, the other end of which is connected by ball joint 33 to spindle arm 32 which extends from a spindle (not shown) mounted on the drum of wheel 34 in a manner analogous to that described above relative to spindle 28.

The foregoing linkage operates in the conventional manner. More specifically, when steering arm 19 moves to the left in FIG. 1 in response to the actuation of steering wheel 11, spindle connecting rods 25 and 31 will also move to the left and cause spindle arms 27 and 32, respectively, to turn the wheels with which they are associated toward the right in FIG. 1. Conversely, when steering arm 19 moves to the right the above described linkage will cause the wheels to move to the left in FIG. 1.

The above movement of the wheels is assisted by hydraulically actuated power steering apparatus. To this end, a hydraulic pump 35 is provided with the casing thereof secured to the block of engine 36 and the rotor thereof (not shown) secured to the engine crank shaft 37. Pump 35 may be of any conventional construction. The inlet side of pump 35 is in communication with hydraulic fluid reservoir 38 through conduit 39 (FIG. 1). The outlet side of pump 35 is in communication with control valve 18 through conduit 40.

When steering wheel 11 is not being moved, control valve 18 assumes the neutral position shown in FIG. 2. Therefore, the hydraulic fluid in conduit 40 will pass into valve conduit 41 and then into conduits 42 and 43 in communication therewith. When valve 18 is in a neutral position, lands 44, 45, and 46 which are mounted on stem 16 will be in the position shown. Therefore, hydraulic fluid will tend to pass from conduit 42 into conduit 47 through the space between lands 45 and 46. Conduit 47 is in communication with conduit 48 (FIGS. 1, 2, and 4) which is in communication with chamber 49 of fluid pressure motor 50. Hydraulic fluid will also tend to flow from conduit 43 into conduit 51 through the space between lands 44 and 45. Conduit 51 is in communication with conduit 52 (FIGS. 1, 2, and 4) which, in turn, is in communication with chamber 53 of motor 50.

Motor 50 provides the power required for power steering. More specifically, the motor piston 54 (FIG. 4), is mounted on one end of shaft 55, the other end of which is secured to the frame 23 of the vehicle, as by a ball joint 56. The housing of motor 50 has a pin 56' secured thereto as by bracket 57'. The pin 56' extends through a suitable aperture (not numbered) in steering arm 19. It will readily be appreciated that whenever the hydraulic pressure in chambers 49 and 53 of motor 50 are not equal, there will be a movement of the motor housing relative to piston 54 and this movement, in turn, will cause a corresponding movement of the steering arm 19, as described in detail hereafter.

The hydraulic fluid coming from conduits 42 and 43 which passes through the chambers of valve housing 17 which are between lands 44, 45, and 46 when the valve is in its neutral position is caused to flow into conduit 57 within valve 18. (It is to be noted that conduit 43 is not in communication with conduit 57 except through the space between lands 44 and 45.) Conduit 57 is, in turn, in communication with conduit 58 (FIGS. 1, 2, and 3) which, in turn, is in communication with wiper motor control valve or servo motor 59 (FIGS. 1 and 3) which assumes the position shown in FIG. 3 when hydraulic windshield wiper motor 60 is not in operation. Therefore, the hydraulic fluid passes from conduit 58 to reservoir 38 through conduits 61, 62, 63, and 64 of valve 59, through fitting 65, and through conduit 66. When the wiper motor is not in operation, the hydraulic fluid flowing through conduit 58 by-passes the wiper motor, as discussed in greater detail hereafter.

When the vehicle steering whele 11 is turned, the power steering arrangement provides most of the force required for steering the vehicle in the following manner: As noted above, the turning of wheel 11 will result in a corresponding movement of arm 14. When joint 15 at the end of arm 14 moves to the left in FIGS. 1 and 2, valve stem 16 will be caused to momentarily move to the left relative to valve housing 17 against the bias of spring 67. More specifically, washers 68 and 69 loosely encircle a reduced diameter end of stem 16 and have edges thereof in abutting relationship with shoulders (not numbered) on the inside of the housing 17. Spring 67 extends between the inside faces of washers 68 and 69 to bias them against these shoulders. Spring 67 and washers 68 and 69 are located between a shoulder (not numbered) and a nut (not numbered) on stem 16. As stem 16 momentarily moves to the left, washer 68 will be moved away from its abutting shoulder in the housing, and spring 67 will be compressed. However, spring 67 provides a self-centering action which causes valve 18 to return to the position shown in FIG. 2 after the turning of the wheel 11 has terminated. However, while stem 16 is moving to the left, the lands 44, 45, and 46 thereon will also move to the left to reroute the flow of hydraulic fluid through the valve. More specifically, this movement will result in land 46 obstructing the end of conduit 42 to a greater extent and will also result in land 44 opening the end of conduit 43 to a greater extent. Therefore, the flow of hydraulic fluid from conduit 42 into conduit 57 will be reduced, and hydraulic fluid will be caused to flow from conduit 43 into conduit 51, especially since land 45, after having been moved to the left, permits less of the hydraulic fluid from conduit 43 to exhaust into conduit 57 through the space between lands 44 and 45 than when valve 18 is in the neutral position shown in FIG. 2. This situation results in creating a differential pressure across the faces of piston 54 with high pressure now being exerted in chamber 53, which is in communication with conduit 52, and a lower pressure being exerted in chamber 49, which is in communication with conduit 48. This unbalance of pressure will cause the housing of motor 50 to move to the left relative to piston stem 55 and this movement will be transmitted to steering arm 19 through pin 56' to assist in turning of the vehicle wheels. It will also be noted that the end of conduit 47 which is in communication with conduit 48 leading from chamber 49 of motor 50, will remain partially unobstructed by land 46 when the latter tends to restrict the opening of conduit 42, whereby the hydraulic fluid in chamber 49 may be exhausted through conduit 48, conduit 47, and through the chamber between lands 45 and 46 into conduit 57 as the housing of motor 50 moves to the left.

As noted above, valve 18 is self-centering by virtue of the existence of spring 67 whereby the stem 16 will return to the position shown in FIG. 2 whenever turning of the steering wheel has terminated. This action will cause hydraulic pressure to be equalized in chambers 49 and 53 of motor 18, and the vehicle wheels will be maintained in the position to which they were turned under the power of motor 50.

Whenever joint 15 of arm 14 is moved to the right in FIG. 2, an action which is reverse to that described above when joint 15 is moved to the left, is obtained. More specifically, the movement of joint 15 (and stem 16) to the right will cause washer 69 to be unseated, against the bias of spring 67, from the shoulder on the inside of housing 17. The relative movement between stem 16 and housing 17 will result in land 44 obstructing the end of conduit 43 to a greater extent while permitting the end of conduit 51 to be exposed to the chamber between lands 44 and 45. Furthermore, the movement of valve stem 16 to the right will result in land 46 opening the end of conduit 42 to a greater extent than shown in FIG. 2. This will ultimately result in the supplying of high pressure hydraulic fluid to chamber 49 of motor 50 through conduits 47 and 48 while permitting the low pressure fluid within motor chamber 53 to be exhausted into valve conduit 57 through conduit 52, valve conduit 51, and the chamber between lands 44 and 45. It can thus be seen that the movement of valve stem 16 to the right will result in the supplying of high pressure hydraulic fluid to chamber 49 of motor 50. This will result in moving the housing of motor 50 to the right, relative to piston stem 55, which, in turn, will cause movement of steering arm 19 to the right to provide power steering. As noted above, whenever movement of steering wheel 11 is terminated, self-centering spring 67 causes control valve 18 to return to the neutral position shown in FIG. 2, and the hydraulic pressures on both sides of motor piston 54 will be equalized. Thereafter, the wheels will be maintained in the position to which they were turned until such time as steering wheel 11 is again actuated.

A washer 16' is secured to stem 16. This washer in combination with shoulders (not numbered) on either side thereof in housing 17 define the limits of movement of stem 16 relative to the housing. It will readily be appreciated that in the event of failure of pressure of the hydraulic fluid for any reason, the vehicle may be steered because of the abutting between washer 16' and the coacting shoulders of the housing when the steering wheel is turned.

From the foregoing description of the mode of operation of the hydraulically actuated power steering apparatus, it can readily be seen that there is always a flow of hydraulic fluid through conduit 57 of control valve 18 when the steering wheel is being held stationary. Furthermore, hydraulic fluid always flows through conduit 57 when the steering wheel is being turned because lands 44, 45, and 46 never completely close conduits 43, 57, and 52, respectively. It is the fluid which passes through conduit 57 of valve 18 which is utilized to provide the hydraulic power for operating windshield wiper motor 60.

As explained above, pump 35 is of sufficient capacity to insure that there is always ample flow of hydraulic fluid for proper operation of the power steering even when the engine 36 is idling, and there is therefore always extra fluid flow beyond the requirements for the power steering when the vehicle is being driven with the engine speed above idling. The extra fluid flow is utilized to drive windshield wiper motor 60 in the following manner: When it is desired to place motor 60 in operation, a suitable actuator 70 on the vehicle dashboard is actuated. Actuator 70 may be of the rack and pinion type. One end of Bowden wire unit 71 is coupled to the actuator 70 and the other end thereof is coupled to a control valve 45' (FIG. 5) within wiper motor 60. The wiper motor may be of the same construction disclosed in Patent No. 2,802,232 with certain minor modifications, as described in detail hereafter. (The primed numerals in FIG. 5 correspond to unprimed numerals depicting identical elements of structure in Patent No. 2,802,232.) In FIG. 5, motor control valve 45' is shown tilted upwardly 90° from motor valve seat 42' for the sake of clarity. As is well understood in the art, wiper motor 60 drives the windshield wipers through suitable linkages.

After the motor control valve 45' has been moved to an "on" position, hydraulic fluid under pressure will be caused to communicate with motor 60 through conduit 72 (FIGS. 1 and 3), which is in communication with conduit 58 leading from steering control valve 18. This hydraulic fluid will also be caused to communicate with conduit 73 (FIGS. 1 and 3) through extension 80 (FIG. 5) of conduit 48' which supplies high pressure fluid to conduit 49' which, in turn, supplies this hydraulic fluid to the operating parts of motor 60, as described in detail in the above-mentioned patent. More specifically, when existing port 48' of control valve 45' is in communication with conduit 49', extension 80 will cause high pressure fluid to enter port 81, which leads to conduit 73 through conduit 82 in valve seat 42'. The pressure of hydraulic fluid in conduit 73 will thus be exerted on the face of piston 74 within wiper motor control valve 59 (FIG. 3). A spring 75 is positioned between pistons 74 and 76, which are both slidable within the body of control valve 59. The existence of pressure on the face of piston 74 will cause the unit consisting of piston 74, piston 76, and spring 75 to move to the left in FIG. 3. This occurs because the force on piston 74 is greater than the force on piston 76 because of the former's greater area. This movement will cause the end of piston 76 to reduce the opening within the passage 62, 63, and 64 which constitutes a by-pass about the wiper motor. The throttling piston 76 thus resists the flow through the by-pass and causes a lesser pressure to exist in conduit 64 leading to the reservoir 38 and a greater pressure to exist in conduit 63 and conduit 72 leading to wiper motor 60. An increased pressure in conduit 72 results in an increased pressure in conduit 73 because these conduits are in communication through the motor control valve 45'. This build-up of pressure behind piston 74 results in continued movement of assembly 74—75—76 to the left. In addition to movement to the left of elements 74—75—76, there will be a compression of spring 75 because of the increased pressures exerted on the faces of pistons 74 and 76. This action continues until such time that piston shoulder 74' engages valve shoulder 75'. Thereafter spring 75 will cause piston 76 to vary the opening to conduit 64 in response to fluctuations of hydraulic pressure within conduit 63 to thereby maintain the pressure in conduit 72 leading to wiper motor 60 at a proper value. It will be appreciated that piston assembly 74—75—76 may be moved by the use of a manually actuated mechanical connecting device in lieu of the above-described hydraulic circuit, if desired. Thus, valve 59 performs the dual function of either maintaining the pressure to motor 60 at a proper value or maintaining a substantially reduced pressure, as needed, for energizing piston 74. It will be noted that a vent 77 is provided in the housing of valve 59 to permit pistons 74 and 76 to move relative to each other in an unimpeded manner. The relationship between the control valve 59 and the remainder of the system is an improvement over the system disclosed in application Serial No. 672,227, filed July 16, 1957. An exhaust conduit 78 (FIGS. 1 and 3), which bears the same relationship to the wiper motor as does conduit 11 in Patent No. 2,802,232, leads from motor 60 to T 65 which is in communication with conduit 66, which in turn leads to reservoir 38. The hydraulic fluid which passes through motor 60 is thus fed back to reservoir 38 after it has passed through the wiper motor. The providing of pressurized hydraulic fluid to hydraulic motor 60 in the above-described manner thus causes it to operate.

When the actuator 70 is actuated to turn motor 60 off, the control valve 45' therein will be returned to a position wherein it terminates communication between conduits 72 and 73 because control valve 45' will move to the left (FIG. 5) relative to valve seat 42', and fluid port extension 80 will be moved out of communication with port 81 in valve seat 42'. However, after control valve 45' has completed its movement to the left, a bleed extension 83, which is added to existing angular recess 71' of the motor disclosed in Patent No. 2,802,232, then permits the hydraulic fluid, which exerts a pressure against the face of piston 74, to bleed, at a relatively slow rate, from conduit 73 into conduit 78 from whence it returns to reservoir 38 via conduit 66. As piston assembly 74—75—76 returns to the position shown in FIG. 3 because of the influence of fluid pressure on the face of piston 76, the slow bleeding of fluid from behind piston 74 insures that a sufficiently high hydraulic pressure will be supplied to motor 60 through conduit 72 for a long enough time to insure proper parking of the motor. When the wiper motor is not operating, the exhausted or spent hydraulic fluid from the power steering apparatus flows directly to reservoir 38 through control valve 59 without passing through the wiper motor.

It is to be noted at this point that piston 76, which rides in conduit 63, partially obstructs the opening leading to conduit 64 of valve 59 when motor 60 is in an "off" position. This obstructing results in a slight throttling of the fluid passing into conduit 64 to build up a sufficient pressure in conduit 72 leading to the wiper motor to cause ample pressure to exist on the face of piston 74 to move assembly 74—75—76 to an operating position when the motor control valve 45' places conduits 72 and 73 in communication, as described above. The throttling produced by piston 76 in the above manner is of a very low magnitude which is sufficient to achieve the above purpose, but which is not large enough to cause an appreciable load on the system when the wiper motor is not in operation. In other words, the portrayed construction insures prompt, positive starting of the wiper motor when the control valve 45' is actuated without creating a drag on the system when motor 60 is off.

From the foregoing description, it will readily be appreciated that hydraulic motor 60, when in operation, is always provided with hydraulic fluid at the proper pressure to maintain a proper wiper motor speed in accordance with the setting of actuator 70. Furthermore, the wiper system will in no way interfere with the proper operation of the power steering apparatus because the inherent pressure capacity of pump 35 is sufficient to supply both accessories and because the wiper system utilizes the exhaust hydraulic fluid from the power steering system.

It is also to be noted that when control valve 45' is moved to an "on" position by the use of actuator 70, no other device need be manipulated in order to start the wiper motor. Furthermore, by the manipulation of actuator 70 in the well-known manner to change the relative positions between valve 45' and valve seat 42', the area of communication between conduits 48' and 49' may be varied to vary the speed of motor 60. It can thus be seen that the movement of control valve 45' by the use of actuator 70 is effective for starting the wiper motor, controlling its speed, and parking the wiper motor, control valve 59 during this process acting in the above described manner to supply the wiper motor with hydraulic fluid under pressure necessary for proper operation thereof. When control valve 45' is moved to a parking position, conduit 72' therein will communicate with conduit 41' in valve seat 42' to supply hydraulic fluid to the motor for parking it in accordance with the teachings of Patent No. 2,802,232.

In operation, the pump 35 causes fluid to flow through the above described system whenever the vehicle engine is in operation, and since the speed of the pump is dependent upon the speed of the engine, greater fluid flows will be realized at higher engine speeds than at lower speeds. Whenever the power steering and the wiper motor are not being utilized, that is, when control valve 18 assumes the position shown in FIG. 2 and the wiper motor is off, the hydraulic fluid flows freely through the steering system back to sump 38 and the pressure of the fluid which is being pumped by pump 35 is at a very low value. Whenever control valve 18 is actuated so that lands 44, 45, and 46 therein depart from their position shown in FIG. 2, a pressure build-up will be experienced between the control valve and pump 35. However, when the wiper motor is not in operation, the hydraulic fluid which is in conduit 58 beyond valve 18 will be at the low pressure experienced by a substantially freely flowing fluid which is restricted only slightly by piston 76, as described above. When the wiper motor is in operation, control valve 59 will tend to restrict the flow of hydraulic fluid passing into conduit 64 of valve 59, and thereby cause the hydraulic fluid being exhausted from the power steering apparatus to be conducted to the wiper motor through conduit 72. However, since the path of the fluid through the wiper motor is substantially restricted compared to the path it would normally take through conduit 64 of valve 59, there will be a pressure build-up of a sufficient magnitude to drive wiper motor 60. It will thus be appreciated that whether or not the power steering apparatus is actively being actuated, the pressure in conduit 58 leading from control valve 18 will be at a very low value whenever the wiper motor 60 is off, and it is only when the wiper motor is turned on that pump 35 is required to supply the additional pressure and carry the additional load necessary for driving this wiper motor. It will be appreciated that the steering system operates at a much higher pressure than the wiper system. Since the capacity of the pump is sufficient to supply the needs of both the power steering and the wiper systems, and since the wiper system receives the hydraulic fluid only while it is returning to the sump, the demand which the wiper system makes on the pump is subordinated to the demands of the power steering system and therefore cannot interfere with proper operation of the latter.

While a preferred embodiment of the present invention has been disclosed, it is to be understood that the present invention is not limited thereto but may be otherwise embodied within the scope of the following claims.

What is claimed is:

1. In a windshield wiper system for motor vehicles including a first hydraulic motor provided with means for maintaining constant operation of a windshield wiper through continuous action of said first motor, said windshield wiper system being subjected to a relatively low hydraulic pressure when inactive and operable in combination with a second hydraulic motor, said second hydraulic motor providing selective directional movement in response to the actuation of first operator actuated control means, a common fluid pressure source for supplying fluid under pressure to both said first and second motors, a servo motor for coupling said first motor for automatic actuation, said servo motor being responsive to second operator actuated control means to render the first motor operable in series fluid flow at a relatively high pressure with the first control means for the second motor whereby the first motor will be powered by fluid under pressure previously discharged through said first operator actuated control means for said second motor, and bleed means for maintaining said first motor under said relatively high pressure for an interval to thereby effect moving said first motor to a parking position in response to the actuation of said second operator actuated control means when said second control means is used to uncouple said first fluid motor from its source of relatively high fluid operating pressure.

2. In combination in an automotive vehicle: a power steering system including means or pressurizing hydraulic fluid, means for utilizing said pressurized fluid for selectively actuating apparatus to assist in the steering of a vehicle; a windshield wiper system comprising a windshield wiper blade, an hydraulic motor for driving said blade, control means for placing said motor in an operating condition or a non-operating condition wherein it is parked at the end of its travel; and valve means automatically operable in response to the actuation of said control means for causing hydraulic fluid to be continuously supplied to said wiper motor directly upon discharge from said power steering system at an operating pressure when said control means causes said motor to be in an operating condition, and for making available hydraulic fluid to said wiper motor at a starting pressure when said control means causes said motor to be parked in a non-operating condition, said starting pressure being of a much lower magnitude than said operating pressure to thereby cause said wiper system to place a much lower load on said pump when said motor is in a non-operating condition than when it is in an operating condition.

3. In combination in an automotive vehicle: a power steering system including means for pressurizing fluid, means for utilizing said pressurized fluid for selectively actuating apparatus to assist in the steering of a vehicle; a windshield wiper system comprising a windshield wiper blade, a motor for driving said blade; unitary control means for causing said pressurized fluid to communicate with said motor, control the speed of said motor, and cause said motor to park said blades at the end of a wiper stroke, and fluid directing means automatically responsive to the actuation of said unitary control means to cause pressurized fluid to be continuously conducted to the motor directly from said steering system at a predeterminable operating pressure, said fluid directing means automatically providing for lessening of said pressure when the motor control is set in a parked position.

4. A motor vehicle having a hydraulic power steering system including an engine driven pump connected to a steering motor control valve by a pressure conduit, return conduit means for the liquid flow from the motor control valve back to a system reservoir, a windshield wiper system having a wiper and a hydraulic motor therefor arranged in the return conduit means, a wiper motor control adapted to be opened for directing the returning liquid flow into the wiper motor to operate it and adapted to be closed for arresting the returning flow through said motor to automatically park the wiper in the end region of its travel, said return conduit means having a bypass about the wiper motor for returning the flow back to the reservoir when the wiper is parked and returning a portion of the flow back to the reservoir while the wiper is running, and pressure regulating means to resist the flow of the returning liquid through the bypass for building up the pressure for wiper motor operation when the wiper motor control is opened.

5. A motor vehicle having an hydraulic power steering system including an engine driven pump connected to a steering motor control by an inlet conduit and a return conduit for conducting the liquid exhausted from said control back to a system reservoir, a windshield wiper system having an hydraulic motor arranged in a by-pass circuit flow connection leading off from the return conduit, said wiper motor containing a control for directing the liquid flow from the return conduit into the wiper motor to operate it and for arresting the flow to automatically park the wipers at substantially the terminal portions of their travel, and means responsive to the flow directed by said control to increase the pressure of the liquid in said return conduit for operating the wiper motor to actuate the wiper and for permitting the pressure of the fluid in the return conduit to be at a lower value when said wiper motor is not operating.

6. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, the flow of hydraulic fluid from said power steering apparatus varying as said power steering apparatus is used during operation of said vehicle, control means associated with said wiper motor for causing a portion of said exhausted hydraulic fluid to drive said wiper motor when said control means is moved to a wiper motor operating position and for causing said wiper motor to be returned to a parked position, and automatically operable pressure regulating means for permitting the fluid exhausted from said power steering apparatus to exist at a relatively low pressure when said control means is in a parking position and for causing said exhausted fluid which drives said wiper motor to be at a relatively high pressure when said control means is in a position wherein it causes operation of said wiper motor and for causing the flow of said hydraulic fluid to said wiper motor to tend toward being substantially constant regardless of said fluctuations in flow from said power steering apparatus.

7. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, and control means associated with said wiper motor for causing a portion of said exhausted hydraulic fluid to drive said wiper motor when said control means is moved to a wiper motor operating position and for causing said wiper motor to be returned to a parked position when said control means are moved to a wiper motor parking position whereby a wiper driven by said wiper motor is automatically caused to stop at substantially the end portion of its travel notwithstanding that said control means were moved to a parking position at an intermediate portion of wiper travel.

8. In combination in an automotive vehicle: a power steering system including pump means for pressurizing fluid; power steering means for utilizing said pressurized fluid for selectively actuating apparatus to assist in the steering of a vehicle; a reservoir; a windshield wiper system comprising a windshield wiper blade; a motor for driving said blade; unitary control means for causing fluid exhausted from said power steering apparatus to communicate with said motor, control the speed of said motor, and cause said motor to park said blade at the end of a wiper stroke; and fluid directing means automatically responsive to the actuation of said unitary control means to cause pressurized fluid to be continuously conducted to the motor from said power steering apparatus at a predetermined operating pressure, said fluid directing means automatically providing for lessening of said predetermined pressure after the unitary control means have been placed in a parking position, and means associated with said unitary control means for causing said fluid directing means to continue to supply fluid to said motor at said predetermined operating pressure for a time interval after said unitary control means are utilized to park said blade whereby proper fluid pressure for parking said motor is assured.

9. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, control means associated with said wiper motor for causing a portion of said exhausted hydraulic fluid to drive said wiper motor when said control means is moved to a wiper motor operating position and for causing said wiper motor to be returned to a parked position, valve means automatically causing the pressure of hydraulic fluid exhausted from said power steering apparatus to be at a relatively high value when said control means places said motor in an operating condition and to be at a relatively low value after said control means places said motor in a parking position, and means operatively associated with said control means to cause the pressure of said fluid exhausted from said steering apparatus to remain at a relatively high value for a short interval of time after said control means is moved to a parking position to thereby assure a sufficient supply of pressurized hydraulic fluid for parking said motor and thereafter permitting said relatively high hydraulic pressure of said fluid exhausted from said steering apparatus to be reduced to said relatively low value whereby said wiper system imposes less load on said hydraulic pump when said wiper motor is parked than when it is in operation.

10. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, control means associated with said wiper motor for causing a portion of said exhausted hydraulic fluid to drive said wiper motor when said control means is moved to a wiper motor operating position and for automatically causing said wiper motor to be returned to a parked position in the end region of its travel, and throttling means for causing the pressure of the hydraulic fluid exhausted from said power steering apparatus to be of a predetermined magnitude for proper wiper motor operation when said control means cause said motor to operate, and pressure relief means associated with said throttling means for limiting the pressure of hydraulic fluid supplied to said wiper motor in the event it exceeds said predetermined magnitude.

11. The combination set forth in claim 10 wherein the flow of hydraulic fluid exhausted from said power steering apparatus varies in accordance with varying conditions of usage of said power steering apparatus and wherein said pressure relief means serves the additional function of causing said throttling means to tend to even out the flow of hydraulic fluid to an operating wiper motor irrespective of said variations in flow of hydraulic fluid exhausted from said power steering apparatus.

12. The combination set forth in claim 11 wherein said throttling means are operatively associated with said control means to cause said hydraulic fluid exhausted from said power steering apparatus to exist at a relatively high pressure when said wiper motor is in operation and to be at a relatively low pressure when said wiper motor is parked whereby said wiper system imposes less of a load on said pump when said wiper motor is parked than when it is operating.

13. The combination set forth in claim 12 wherein said control means includes means for causing said throttling means to retain said relatively high pressure in said hydraulic fluid exhausted from said power steering apparatus for a short interval after said control means are moved to a parking position whereby sufficient pressure is assured until said motor is automatically moved to a parking position.

14. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, the flow of hydraulic fluid from said power steering apparatus varying as said power steering apparatus is used during operation of said vehicle, control means associated with said wiper motor for causing a portion of said exhausted hydraulic fluid to drive said wiper motor when said control means is moved to a wiper motor operating position and for causing said wiper motor to be returned to a parked position, and pressure regulating means responsive to the position of said control means for causing the pressure of said exhausted hydraulic fluid to be at a relatively high value when said wiper motor is in operation and to be at a relatively low value when said wiper motor is parked, whereby said wiper motor imposes less of a load on said pump when said wiper motor is parked than when it is in operation, said pressure regulating means also causing the rate of hydraulic fluid flowing to an operating wiper motor to tend toward remaining substantially constant irrespective of said varying flow of exhausted fluid from said power steering apparatus.

15. In combination in an automotive vehicle: an hydraulic pump, power steering apparatus operable in response to the supplying of pressurized hydraulic fluid thereto from said pump, a reservoir for receiving hydraulic fluid exhausted from said power steering apparatus, a wiper motor, conduit means for causing said wiper motor to be in communication with the exhausted hydraulic fluid from said power steering apparatus, control means associated with said wiper motor for causing a portion of said exhausted hydraulic fluid to drive said wiper motor when said control means is moved to a wiper motor operating position and for causing said wiper motor to be returned to a parked position, and valve means automatically operable in response to the manipulation of said control means for causing the pressure of said fluid exhausted from said power steering apparatus to be at a predetermined relatively high value when said motor is in an operating condition and to be at a relatively low value when said motor is parked, whereby said motor imposes less of a load on said pump when said wiper system is parked than when it is in operation, said valve means also functioning to relieve the pressure in said conduit means in the event that it tends to exceed said predetermined relatively high pressure value.

16. A motor vehicle having, in combination, a hydraulic power steering system with a pressure pump connected in circuit by a high pressure line to a steering motor from which latter the flow of spent liquid is returned at a relatively lower normal pressure through a passage leading to a circuit-included reservoir at the inlet side of the pump, a hydraulic windshield cleaner motor connected for driving a wiper and operable by the returning spent liquid flow after its pressure has been amplified substantially to a given degree above its normal, a wiper motor control valve for diverting at least a portion of the spent liquid flow, and pressure amplifying means responsive to the diverted portion of the spent flow for repressurizing that portion substantially to such given degree for wiper operation.

17. A motor vehicle having, in combination, a hydraulic power steering system with a pressure pump connected in circuit by a high pressure line to a steering motor from which latter the flow of spent liquid is returned at a relatively lower normal pressure through a passage leading to a circuit-included reservoir at the inlet side of the pump, a hydraulic windshield cleaner motor driving a wiper and operable by the returning spent liquid flow after its pressure is amplified substantially to a given degree above its normal, a wiper motor control valve for diverting at least a portion of the spent liquid flow through the wiper motor, pressure amplifying means responsive to the diverted portion of the spent flow for repressurizing that portion for wiper operation, said pressure amplifying means embodying a bypass conduit forming a part of the return passage, and bypass restricting means to raise the pressure of the divided portion of the spent flow to so pressurize it.

18. A motor vehicle according to claim 17, wherein said restricting means throttles the bypass for such repressurizing against the reaction of the wiper motor energizing pressure.

19. In combination, an hydraulic pump, first hydraulic motor means, second hydraulic motor means, first conduit means for coupling said hydraulic pump and said first hydraulic motor means in closed circuit relationship whereby pressurized hydraulic fluid is supplied by said pump to said first hydraulic motor means and thereafter returned to said pump, second conduit means for coupling said second hydraulic motor means in parallel across said first conduit means, control means operatively associated with said first conduit means for selectively restricting the flow of hydraulic fluid therethrough and thereby causing flow of pressurized fluid through said second conduit means to thereby effect operation of both said first and second hydraulic motor means, and pressure regulating means tending to maintain the pressure of hydraulic fluid supplied to said second motor means substantially constant irrespective of the increasing or decreasing of hydraulic pressure in said first conduit means resulting from the operation of said first motor means and irrespective of the tendency for increasing or decreasing the hydraulic pressure in said second conduit means resulting from the operation of said second motor means.

References Cited in the file of this patent
UNITED STATES PATENTS

| | | |
|---|---|---|
| 2,298,474 | Ericson et al. | Oct. 13, 1942 |
| 2,446,611 | Rose | Aug. 10, 1948 |
| 2,799,996 | Van Meter | July 23, 1957 |
| 2,880,586 | Lincoln | Apr. 7, 1959 |

FOREIGN PATENTS

| | | |
|---|---|---|
| 799,801 | Great Britain | Aug. 13, 1958 |

UNITED STATES PATENT OFFICE
CERTIFICATE OF CORRECTION

Patent No. 3,075,226　　　　　　　　　　　　　　　January 29, 1963

Raymond A. Deibel et al.

It is hereby certified that error appears in the above numbered patent requiring correction and that the said Letters Patent should read as corrected below.

Column 4, line 42, for "whele" read -- wheel --; column 9, line 19, for "or" read -- for --.

Signed and sealed this 27th day of August 1963.

(SEAL)
Attest:

ERNEST W. SWIDER　　　　　　　　　　　　　　　DAVID L. LADD
Attesting Officer　　　　　　　　　　　　　　　　Commissioner of Patents